United States Patent
Kosaka

(10) Patent No.: US 12,454,678 B2
(45) Date of Patent: Oct. 28, 2025

(54) MUSCLE DIFFERENTIATION-PROMOTING ACTIONS OF ERGOTHIONEINE, ASCORBIC ACID 2-GLUCOSIDE, ASCORBIC ACID, AND COMBINATION THEREOF

(71) Applicant: NAGASE & CO., LTD., Osaka (JP)

(72) Inventor: Kunio Kosaka, Kobe (JP)

(73) Assignee: NAGASE & CO., LTD., Osaka (JP)

( * ) Notice: Subject to any disclaimer, the term of this patent is extended or adjusted under 35 U.S.C. 154(b) by 1250 days.

(21) Appl. No.: 17/255,779

(22) PCT Filed: Jun. 11, 2019

(86) PCT No.: PCT/JP2019/023114
§ 371 (c)(1),
(2) Date: Dec. 23, 2020

(87) PCT Pub. No.: WO2020/004014
PCT Pub. Date: Jan. 2, 2020

(65) Prior Publication Data
US 2021/0130787 A1 May 6, 2021

(30) Foreign Application Priority Data
Jun. 29, 2018 (JP) .................................. 2018-124613

(51) Int. Cl.
| | | |
|---|---|---|
| *C12N 5/077* | (2010.01) | |
| *A23L 2/52* | (2006.01) | |
| *A23L 33/00* | (2016.01) | |
| *A23L 33/15* | (2016.01) | |
| *A23L 33/175* | (2016.01) | |
| *A61K 31/375* | (2006.01) | |
| *A61K 31/4172* | (2006.01) | |
| *A61K 31/7048* | (2006.01) | |

(52) U.S. Cl.
CPC ............. *C12N 5/0658* (2013.01); *A23L 2/52* (2013.01); *A23L 33/15* (2016.08); *A23L 33/175* (2016.08); *A23L 33/40* (2016.08); *A61K 31/375* (2013.01); *A61K 31/4172* (2013.01); *A61K 31/7048* (2013.01); *A23V 2002/00* (2013.01); *C12N 2500/32* (2013.01); *C12N 2500/38* (2013.01)

(58) Field of Classification Search
CPC ............. C12N 5/0658; C12N 2500/32; C12N 2500/38; A61K 31/375; A23L 33/175; A23L 33/15
See application file for complete search history.

(56) References Cited

U.S. PATENT DOCUMENTS

| | | | |
|---|---|---|---|
| 2009/0142285 A1* | 6/2009 | Kurfurst | A61K 8/4946 514/25 |
| 2010/0227307 A1 | 9/2010 | Hausman et al. | |
| 2011/0262965 A1* | 10/2011 | Barrett | C12N 5/0018 435/235.1 |
| 2012/0141611 A1 | 6/2012 | Landes et al. | |
| 2015/0157648 A1* | 6/2015 | Hausman | A61P 21/00 514/392 |
| 2016/0067221 A1 | 3/2016 | Hseu et al. | |

FOREIGN PATENT DOCUMENTS

| | | |
|---|---|---|
| JP | 2009-167169 A | 7/2009 |
| WO | WO 03/099277 A1 | 12/2003 |
| WO | WO 2008/127959 A1 | 10/2008 |

OTHER PUBLICATIONS

Lee, W. Y.; et al. "Ergothioneine Contents in Fruiting Bodies and Their Enhancement in Mycelial Cultures by the Addition of Methionine" 2009 Mycobiology, vol. 37, p. 43-47. (Year: 2009).*
Mattila, P.; et al. "Contents of Vitamins, Mineral Elements, and Some Phenolic Compounds in Cultivated Mushrooms" 2001, J. Agric. Food. Chem., vol. 49, pp. 2342-2348. (Year: 2001).*
Yoshida, S.; et al. "The Anti-Oxidant Ergothioneine Augments the Immunomodulatory Function of TLR Agonists by Direct Action on Macrophages" 2017, PLoS One, vol. 12, e0169360. (Year: 2017).*
Ey, J.; et al. "Dietary Sources and Antioxidant Effects of Ergothioneine" 2007, Journal of Agricultural and Food Chemistry, vol. 55, pp. 6466-6474. (Year: 2007).*
Asmus, K.-D.; et al. "One-electron oxidation of ergothioneine and analogues investigated by pulse radiolysis: redox reaction involving ergothioneine and vitamin C" 1996, Biochem. J., vol. 315, pp. 625-629. (Year: 1996).*
Sandiford, S.D.E.; et al. "Dual Oxidase Maturation factor 1 (DUOXA1) overexpression increases reactive oxygen species production and inhibits murine muscle satellite cell differentiation" 2014, Cell Communication and Signaling, 12:5. (Year: 2014).*
Wang, X.; et al. "Evaluation of L-ascorbyl-2-glucose as the source of vitamin C for juvenile Korean rockfish Sebastes schlegeli (Hilgendorf)" 2003 Aquaculture Research, vol. 34, pp. 1337-1341. (Year: 2003).*
Wakamiya, H.; et al. "In Situ Intestinal Absorption of 2-O-a-D-Glucopyranosyl-L-Ascorbic Acid in Guinea Pigs" 1995, J. Nutr. Sci. Vitaminol., vol. 41, pp. 265-272. (Year: 1995).*
Allen, R. E. "Muscle Cell Growth and Development", National Academies Press, 1988. (Year: 1988).*
Miyai, E.; et al. "Ascorbic Acid 2-0-a-Glucoside-Induced Redox Modulation in Human Keratinocyte Cell Line, SCC: Mechanisms of Photoprotective Effect against Ultraviolet Light B" 1997, Biol. Pharm. Bull., vol. 20, pp. 632-636. (Year: 1997).*

(Continued)

*Primary Examiner* — Eric Olson
*Assistant Examiner* — Benjamin M Brandsen
(74) *Attorney, Agent, or Firm* — Oblon, McClelland, Maier & Neustadt, L.L.P.

(57) ABSTRACT

A culture medium and a culture medium additive which can promote myogenic differentiation and which contain ergothioneine, ascorbic acid 2-glucoside, ascorbic acid, or a combination thereof. A kit, pharmaceutical composition, food, and drink may also promote myogenic differentiation.

15 Claims, 4 Drawing Sheets
Specification includes a Sequence Listing.

(56) References Cited

OTHER PUBLICATIONS

Mitsumoto, Y.; et al. "A long-lasting vitamin C derivative, ascorbic acid 2-phosphate, increases myogenin gene expression and promotes differentiation in L6 muscle cells" 1994, Biochem. Biophys. Res. Commun., vol. 199, pp. 394-402. (Year: 1994).*

Laurenza, I.; et al. "Modulation of palmitic acid-induced cell death by ergothioneine: Evidence of an anti-inflammatory action" 2008, BioFactors, vol. 33, pp. 237-247. (Year: 2008).*

Colognato, R.; et al. "Modulation of hydrogen peroxide-induced DNA damage, MAPKs activation and cell death in PC12 by ergothioneine" 2006, Clinical Nutrition, vol. 25, pp. 135-145. (Year: 2006).*

Hansen, J. M.; et al. "A reducing redox environment promotes C2C12 myogenesis: Implications for regeneration in aged muscle" 2007, Cell Biology International, vol. 31, pp. 546-553. (Year: 2007).*

Neumann, T.; et al. "Tissue Engineering of Skeletal Muscle Using Polymer Fiber Arrays" 2003, Tissue Engineering, vol. 9, pp. 995-1003. (Year: 2003).*

Han, R.; et al. "Functions, applications and production of 2-O-D-glucopyranosyl-L-ascorbic acid" 2012, Applied Microbiology and Biotechnology 2012, vol. 95, pp. 313-320. (Year: 2012).*

Yamamoto, I.; Muto, N. "Bioavailability and Biological Activity of L-Ascorbic Acid 2-0-a-Glucoside" 1992, Journal of Nutritional Science and Vitaminology, vol. 38, pp. 161-164. (Year: 1992).*

Franceschi, R. T.; et al. "The Role of Ascorbic Acid in Mesenchymal Differentiation" 1992, Nutrition Reviews, vol. 50, pp. 65-70. (Year: 1992).*

Ishimoto, T.; et al. "Organic Cation Transporter-Mediated Ergothioneine Uptake in Mouse Neural Progenitor Cells Suppresses Proliferation and Promotes Differentiation into Neurons" PLoS One 2014, vol. 9, e89434. (Year: 2014).*

Shimshek, D. R.; et al. "The HSP70 Molecular Chaperone Is Not Beneficial in a Mouse Model of a-synucleinopathy" PLoS One 2010, vol. 5, e10014. (Year: 2010).*

Japanese Office Action issued on May 23, 2023 in Japanese Patent Application No. 2020-527369 (with unedited computer-generated English translation), 9 pages.

Extended European Search Report issued Apr. 5, 2022 in European Patent Application No. 19826692.6, 7 pages.

Combined Taiwanese Office Action and Search Report issued Mar. 31, 2023 in Patent Application No. 108120402 (with English machine translation), 10 pages.

Tso-Ching Lin, et al., "The Ergogenic Effects of Ergothioneine Against Oxidative Stress and Muscular Damage Induced by Acute Exercise in Aging Rats," NCYU Physical Education, Health & Recreation Journal, vol. 15, No. 2, Aug. 31, 2016, pp. 110-122 (with English Abstract).

International Search Report issued Sep. 10, 2019 in PCT/JP2019/023114 (submitting English translation only), 2 pages.

International Preliminary Report on Patentability and Written Opinion of the International Searching Authority issued Dec. 29, 2020 in PCT/JP2019/023114 (submitting English translation only), 7 pages.

Yasuhide Mitsumoto, et al., "A Long-Lasting Vitamin C Derivative, Ascorbic Acid 2-Phosphate, Increases Myogenin Gene Expression and Promotes Differentiation in L6 Muscle Cells" Biochemical And Biophysical Research Communications, vol. 199, No. 1, Feb. 28, 1994, pp. 394-402.

Yavuz Öztürkler, et al., "The Effects of L-Ergothioneine and L-Ascorbic Acid on the In Vitro Maturation (IVM) and Embryonic Development (IVC) of Sheep Oocytes" Kafkas Univ Vet Fak Derg, vol. 16, No. 5, 2010, pp. 757-763.

Yasuharu Onitsuka, "Investigation of an Efficient Culture Condition for the Differentiation of Murine Skeletal Myoblasts" Japanese Journal of Veterinary Research, vol. 61, No. 1&2, May 2013, pp. 39-74 and cover page.

K. Grabiec, et al., "The Influence of High Glucose and High Insulin on Mechanisms Controlling Cell Cycle Progression and Arrest in Mouse C2C12 Myoblasts: the Comparison with IGF-I Effect" J Endocrinol Invest, vol. 37, 2014, pp. 233-245.

Ga-Yeon Go, et al., "Ginsenoside Rg1 from Panax Ginseng Enhances Myoblast Differentiation and Myotube Growth" Journal of Ginseng Research, vol. 41, 2017, pp. 608-614.

* cited by examiner

```
                         SEQUENCE LISTING

<160> NUMBER OF SEQ IDS NOS: 7

<210> SEQ ID NO 1
<211> LENGTH: 20
<212> TYPE: DNA
<213> ORGANISM: Artificial Sequence
<220> FEATURE:
<223> OTHER INFORMATION: Nucleotide sequence of a forward primer for
      amplifying MyoD gene

<400> SEQUENCE: 1
agtgaatgag gccttcgaga                                                20

<210> SEQ ID NO 2
<211> LENGTH: 20
<212> TYPE: DNA
<213> ORGANISM: Artificial Sequence
<220> FEATURE:
<223> OTHER INFORMATION: Nucleotide sequence of a reverse primer for
      amplifying MyoD gene

<400> SEQUENCE: 2
gcatctgagt cgccactgta                                                20

<210> SEQ ID NO 3
<211> LENGTH: 20
<212> TYPE: DNA
<213> ORGANISM: Artificial Sequence
<220> FEATURE:
<223> OTHER INFORMATION: Nucleotide sequence of a forward primer for
      amplifying PPIA gene

<400> SEQUENCE: 3
gtctccttcg agctgtttgc                                                20

<210> SEQ ID NO 4
<211> LENGTH: 20
<212> TYPE: DNA
<213> ORGANISM: Artificial Sequence
<220> FEATURE:
<223> OTHER INFORMATION: Nucleotide sequence of a reverse primer for
      amplifying PPIA gene

<400> SEQUENCE: 4
gatgccagga cctgtatgct                                                20

<210> SEQ ID NO 5
<211> LENGTH: 20
<212> TYPE: DNA
<213> ORGANISM: Artificial Sequence
<220> FEATURE:
<223> OTHER INFORMATION: Nucleotide sequence of a forward primer for
      amplifying MyH2 gene

<400> SEQUENCE: 5
gagcaaagat gcagggaaag                                                20
```

```
<210> SEQ ID NO 6
<211> LENGTH: 20
<212> TYPE: DNA
<213> ORGANISM: Artificial Sequence
<220> FEATURE:
<223> OTHER INFORMATION: Nucleotide sequence of a reverse primer for
      amplifying MyH2 gene

<400> SEQUENCE: 6
taagggttga cggtgacaca                                                    20

<210> SEQ ID NO 7
<211> LENGTH: 20
<212> TYPE: DNA
<213> ORGANISM: Artificial Sequence
<220> FEATURE:
<223> OTHER INFORMATION: Nucleotide sequence of a forward primer for
      amplifying ACTA1 gene

<400> SEQUENCE: 7
cgacatcagg aaggacctgt                                                    20
```

MUSCLE DIFFERENTIATION-PROMOTING ACTIONS OF ERGOTHIONEINE, ASCORBIC ACID 2-GLUCOSIDE, ASCORBIC ACID, AND COMBINATION THEREOF

TECHNICAL FIELD

The present invention relates to the promotion of cell differentiation. In particular, the present invention relates to a culture medium and a culture medium additive for promoting muscle differentiation containing ergothioneine as well as a pharmaceutical composition, food and drink and the like for promoting muscle differentiation.

BACKGROUND ART

With progressive aging of society in recent years, various obstacles such as decrease in motor function, increase in risk of falling down and bone fracture, and a locomotive syndrome accompanied with decrease in muscle mass and muscular strength have been problems. Muscle regeneration is important to treat and improve these obstacles, and muscle regeneration requires muscle differentiation. Muscle differentiation has been extensively investigated (for example, refer to Non Patent Literature 1).

CITATION LIST

Non Patent Literature

Non Patent Literature 1: Onitsuka Y. Investigation of an efficient culture condition for the differentiation of murine skeletal myoblasts. Jpn. J. Vet. Res. 2013. 61 (1&2): 39.

SUMMARY OF INVENTION

Technical Problem

An effective safe medicine and an effective safe method for promoting muscle differentiation need to be found to treat and improve a symptom or a condition such as a locomotive syndrome which requires muscle regeneration.

Solution to Problem

The present inventors have earnestly investigated repeatedly to solve the above-mentioned problem, first found that ergothioneine promotes muscle differentiation, the use of ergothioneine in combination with ascorbic acid 2-glucoside and/or ascorbic acid greatly promotes muscle differentiation, ascorbic acid 2-glucoside promotes muscle differentiation alone, and that ascorbic acid promotes muscle differentiation alone, to reach completion of the present invention.

Accordingly, the present invention provides the following.

(1) A culture medium for promoting muscle differentiation, comprising ergothioneine.

(2) The culture medium according to (1), further comprising ascorbic acid 2-glucoside and/or ascorbic acid.

(3) A culture medium additive for promoting muscle differentiation, comprising ergothioneine.

(4) The culture medium additive according to (3), further comprising ascorbic acid 2-glucoside and/or ascorbic acid.

(5) A kit for promoting muscle differentiation, comprising ergothioneine.

(6) The kit according to (5), further comprising ascorbic acid 2-glucoside and/or ascorbic acid.

(7) A method for promoting muscle differentiation of cells, comprising culturing cells in a culture medium comprising ergothioneine.

(8) The method according to (7), wherein the culture medium further comprises ascorbic acid 2-glucoside and/or ascorbic acid.

(9) A pharmaceutical composition for promoting muscle differentiation, comprising ergothioneine.

(10) The pharmaceutical composition according to (9), further comprising ascorbic acid 2-glucoside and/or ascorbic acid.

(11) The pharmaceutical composition according to (9) or (10) for promoting muscle regeneration.

(12) Food and drink for promoting muscle differentiation, comprising ergothioneine.

(13) The food and drink according to (12), further comprising ascorbic acid 2-glucoside and/or ascorbic acid.

(14) The food and drink according to (12) or (13) for promoting muscle regeneration.

Advantageous Effects of Invention

According to the present invention, a culture medium and a culture medium additive for muscle differentiation promotion containing ergothioneine; a pharmaceutical composition and food and drink for promoting muscle differentiation; and the like are provided. The culture medium, the culture medium additive, the pharmaceutical composition, and the food and drink of the present invention have excellent capability to promote muscle differentiation. The pharmaceutical composition and the food and drink of the present invention are beneficial to especially elderly people, injured people, sick people, convalescents, and the like. The use of ergothioneine in combination with ascorbic acid 2-glucoside and/or ascorbic acid greatly increases these effects. Also, when ascorbic acid 2-glucoside alone or ascorbic acid alone is used, or these are used in combination, the above-mentioned effects are obtained. Ergothioneine is a substance found in the living body, ascorbic acid 2-glucoside is a substance approved as a food additive and a quasi drug, and ascorbic acid is a substance which widely exists in fruits, vegetables, and the like in nature, so that the culture medium, the culture medium additive, the pharmaceutical composition, and the food and drink of the present invention are highly safe.

DESCRIPTION OF EMBODIMENTS

Figure 1:
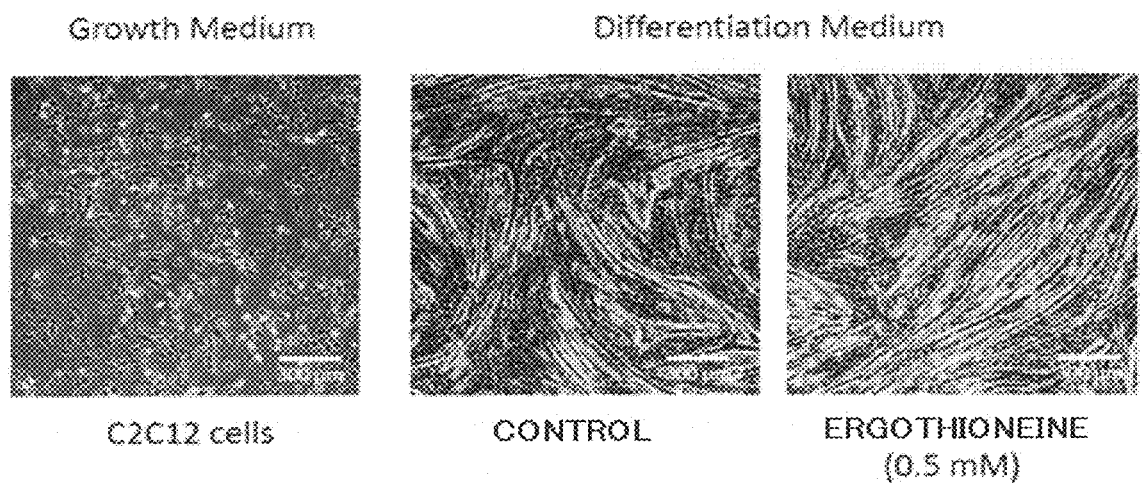
FIG. 1 shows photomicrographs showing an influence of ergothioneine on the muscle differentiation of C2C12 cells. The left photograph shows C2C12 cells before differentiation, the middle photograph shows C2C12 cells which have differentiated in differentiation medium without EGT (control), and the right photograph shows C2C12 cells which have differentiated in differentiation medium containing 0.5 mM EGT.

In a first aspect, the present invention provides a culture medium for promoting muscle differentiation containing ergothioneine.

The present inventors first found that ergothioneine promotes muscle differentiation.

Ergothioneine (hereinafter called EGT) is a type of sulfur-containing amino acids, and it is known that it has various types of physiological activity including antioxidation ability. It is suggested that the antioxidation ability thereof is higher than those of vitamin C, vitamin E, cysteine, and glutathione. It is also shown that EGT has an ultraviolet absorption effect, a melanogenesis inhibitory action, reactive oxygen species-scavenging ability, an elastase activity inhibitory action of suppressing the formation of wrinkles or sagging, and a tyrosinase activity inhibitory action of suppressing the formation of spots. Therefore, EGT is one of compounds which attract attention in especially the aesthetic and food industry. However, the present inventors first found that EGT promotes muscle differentiation.

Herein, muscle differentiation means differentiation from stem cells or muscle precursor cells having the ability to differentiate into skeletal muscle to myotube cells. The culture medium of the present invention is used to promote the differentiation of these cells. The stem cells are mesodermal stem cells. The mesodermal stem cells may exist in the living body, or may be derived from iPS cells or ES cells. Muscle precursor cells of skeletal muscle is known, and satellite cells and myoblasts are illustrated. In a special aspect, muscle differentiation means differentiation from satellite cells or myoblasts to myotube cells. Satellite cells have somatic stem cell-like characteristics, and are precursor cells of muscle cells. Satellite cells are activated to differentiate into myoblasts. Myoblasts proliferate by cell division, and then differentiate into muscle cells. Muscle cells are fused with each other to form multinuclear myotube cells. Myotube cells mature into muscle fibers to form muscular tissue. Satellite cells, myoblasts, muscle cells, myotube cells, and the like are known to those skilled in the art.

EGT used for the present invention may be in a free form, or may be in the form of a salt. The salt of EGT may be formed, for example, between negatively charged oxygen of the carboxyl group of EGT and a hydrogen ion or an alkali metal ion or between the positively charged nitrogen of a trimethyl amino group and a halide ion. EGT used for the present invention may be a hydrate.

It can be confirmed by measuring how much myosin, which is a muscle-specific protein, is expressed, whether differentiation into muscle is performed. The promotion of muscle differentiation means increase in the myosin gene expression level in stem cells or muscle precursor cells herein. In a special aspect, the promotion of muscle differentiation means that satellite cells or myoblasts change into cells which highly express myosin mRNA. For example, the promotion of muscle differentiation may be defined as muscle cells derived from satellite cells or myoblasts increasing the gene expression level of myosin mRNA, which is a muscle marker, to 1.5 times or more, preferably 2 times or more, more preferably 3 times or more. Further, for example, the promotion of muscle differentiation means increase in the expression of MyoD mRNA in satellite cells or myoblasts to 1.5 times or more, preferably 2 times or more the expression in the absence of EGT.

The culture medium of the present invention may be a known culture medium to which EGT is added. The culture medium of the present invention is preferably a culture medium which is used for muscle differentiation and to which EGT is added. Those skilled in the art can suitably determine the amount of EGT added to the culture medium depending on the type of stem cells or muscle precursor cells (for example, satellite cells or myoblasts), culture conditions such as culture temperature and culture time etc, and culture medium composition, and the like. For example, to a known low serum culture medium for muscle differentiation may be added EGT at a concentration of around 0.001 mM to around 1.0 mM, preferably around 0.1 mM to around 0.5 mM, and the amount is not, however, limited to these amounts.

The culture medium of the present invention may be in any form of a liquid, a semisolid, a solid, and the like, and is not particularly limited. The culture medium of the present invention is usually a liquid culture medium. Alternatively, the culture medium of the present invention may be in the form of a composition. For example, the culture medium may be in the form of a liquid culture medium composition which can be used as it is, or may be in the form of a composition such as a concentrated liquid, paste, powder, or a pellet wherein diluting the composition with a medium such as water adjusts the concentration to a desired component concentration.

In a second aspect, the present invention provides a culture medium additive for promoting muscle differentiation containing EGT.

The additive of the present invention is added at the time of culture medium preparation or added to a prepared culture medium. Alternatively, the additive of the present invention may be added to the culture medium during culture.

The amount of EGT in the additive of the present invention is an amount wherein the concentration is adjusted to a desired EGT concentration when it is added to the culture medium. The EGT concentration in the culture medium is as described above. The additive of the present invention may contain one or more components besides EGT, and may contain, for example, nutrient components required for cell growth; a component such as a fibroblast growth factor (FGF), a hepatocyte growth factor (HGF), insulin, an insulin-like growth factor (IGF) which promotes muscle differentiation; or the like.

The form of the additive of the present invention may be any form, and may be a solid such as powder, granules, or a tablet; a semisolid such as a paste; or a liquid such as a concentrated liquid.

In a third aspect, the present invention provides a kit for promoting muscle differentiation containing EGT.

EGT contained in the kit of the present invention is usually placed in a container. The shape and the material of the container are not particularly limited. Components other than EGT may be contained in the container. The kit of the present invention may include one or more containers containing, for example, nutrient components required for cell growth, a component which promotes muscle differentiation, or the like besides the container containing EGT. The kit of the present invention may contain the above-mentioned culture medium or the above-mentioned culture medium additive. An instruction manual is usually attached to the kit of the present invention.

In a fourth aspect, the present invention provides a method for promoting the muscle differentiation of cells comprising culturing cells in a culture medium containing EGT. In the method of the present invention, satellite cells or myoblasts are cultured. Culture conditions such as a culture medium composition, culture temperature, and culture time are known to those skilled in the art.

In a fifth aspect, the present invention provides a pharmaceutical composition for promoting muscle differentiation containing EGT. If a subject to which the pharmaceutical composition of the present invention is administered is an animal which receives benefit by regenerating muscle, the animal species is not particularly limited. Although an animal to which the pharmaceutical composition of the present invention is administered is preferably a human, the animal may be an animal other than a human such as a dog, a cat, a horse, and a bovine, and the like.

Muscle regeneration can be promoted by promoting muscle differentiation. Muscle regeneration means returning the muscle mass which has decreased due to some factor to the original level or returning the muscular strength which has decreased due to some factor to the original level herein. Although the suppression of sarcopenia, the promotion of muscle regeneration at the time of damage, and the like are illustrated as specific uses of the pharmaceutical composition of the present invention, the uses are not limited to these uses. Satellite cells exist between the cell membranes of muscle fibers and basement membranes.

When muscle receives a stimulus such as injury, satellite cells are activated to differentiate into myoblasts.

Myoblasts differentiate into muscle cells to form myotubes. Myotubes form muscle fibers, or fuse with muscle fiber to regenerate skeletal muscle. Since EGT promotes the muscle differentiation of satellite cells or myoblasts to muscle cells, the pharmaceutical composition of the present invention may be used for promoting muscle regeneration, especially skeletal muscle regeneration. The muscle to be regenerated may be located at any site.

Although examples of the method for measuring muscle mass, especially skeletal muscle mass, include a BIA method, a method of using a CT or an MRI, a DXA method, an ultrasonic echo method, and a method for observation with the naked eyes, the measuring method is not particularly limited to these. Although examples of the method for measuring muscular strength, especially skeletal muscular strength, include methods for measuring grasping power, back strength, leg extension force, and walk speed; sitting-up; standing long jump; and ball-throwing, the measuring method is not limited to these.

The pharmaceutical composition of the present invention can be produced, for example, using known means and a known method such as mixing, kneading, stirring, drying, pulverization, tablet compression, and solubilization. The pharmaceutical composition of the present invention usually contains a carrier or an excipient. The carrier or the excipient is known to those skilled in the art, and can be selected depending on the administration site, the administration route, the amount of EGT contained, and the like.

The dosage form of the pharmaceutical composition of the present invention may be any dosage form, and is not particularly limited. The dosage form may be a liquid such as an injection, a transfusion, an oral liquid medicine, or a lotion; a semisolid such as cream, paste, and ointment; a solid such as a tablet, powder, granules, a troche, and a suppository; or freeze-dried powder reconstituted before use.

The administration route of the pharmaceutical composition of the present invention may be any route. Although examples of the route include intramuscular injection, hypodermic injection, intradermal injection, intravenous injection, infusion, endermic administration, administration from cheek mucous membrane, anal administration, and oral administration, the route is not particularly limited. In the case of skeletal muscle regeneration, the pharmaceutical composition of the present invention is preferably intramuscularly injected.

The dose of EGT by the pharmaceutical composition of the present invention is an amount which enables to promote muscle differentiation or to regenerate muscle in the body. The dose of EGT by the pharmaceutical composition of the present invention varies depending on the desired degree of muscle regeneration, the administration site, the administration route, and the like. For example, in the case of the oral administration to an adult, the dose may be usually 1 mg to 5000 mg, preferably 10 mg to 1000 mg per day. The dose is not, however, limited to these amounts. A doctor can determine the dose of EGT suitably, for example, while seeing the size and the amount of muscle.

The pharmaceutical composition of the present invention may be administered once to several times per day. The pharmaceutical composition of the present invention may be administered every day or every one to several days. The administration of the pharmaceutical composition of the present invention may be continued until a desired muscle regeneration effect appears.

In a sixth aspect, the present invention provides food and drink for promoting muscle differentiation. The food and drink of the present invention is given to an animal which receives benefit by regenerating muscle. Although the animal species is not particularly limited, the animal species is preferably a human. The animal species may be an animal other than a human such as a dog, a cat, and a horse, and the like.

The food and drink of the present invention includes health food, specified health food, nutrient functional food, food with functional claims, and the like besides general food.

The food and drink of the present invention may be provided as a supplement. The form of the supplement may be any form, and is not particularly limited.

The form of the food and drink of the present invention may be any form, and is not particularly limited. For example, the food and drink of the present invention may be, for example, existing food and drink to which EGT is added. For example, the form may be a form such as a tablet, powder, granules, a troche, a candy, juice, nectar, drink, or seasoning. The supplement can be produced by a method according to a known method for producing a pharmaceutical composition or a method according to a known method for producing food and drink.

As described above, since EGT promotes the muscle differentiation of satellite cells or myoblasts into muscle cells, the food and drink of the present invention may be used to promote muscle regeneration, especially skeletal muscle regeneration. Although the suppression of sarcopenia, the promotion of muscle regeneration at the time of damage, and the like are illustrated as specific uses of the food and drink of the present invention, the uses are not limited to these uses. The muscle to be regenerated may be located at any site.

The intake of EGT by the food and drink of the present invention is an amount which enables to promote muscle differentiation or to regenerate muscle in the living body. The intake of EGT by the food and drink of the present invention varies depending on the desired degree of muscle regeneration, the muscle regeneration site, and the like. For example, in the case of oral administration to an adult, the intake may be usually 1 mg to 5000 mg, preferably 10 mg to 1000 mg per day. The intake is not, however, limited to these amounts.

The food and drink of the present invention may be taken in one to several times per day. The food and drink of the present invention may be taken in everyday or every one to several days. The administration of the food and drink of the present invention may be continued until a desired muscle regeneration effect appears.

As mentioned above, the present inventors first found that muscle differentiation is greatly promoted by using EGT in combination with ascorbic acid 2-glucoside (hereinafter, called AG) and/or ascorbic acid (hereinafter, called VC). Therefore, the culture medium, the culture medium additive, the kit, the pharmaceutical composition, and the food and drink of the present invention described above may contain AG and/or VC in addition to EGT. EGT may be used in combination with AG and/or VC in the method for promoting the muscle differentiation of cells of the present invention described above. The combined use of EGT with AG and/or VC enables to promote muscle differentiation and further promoting muscle regeneration.

AG is a vitamin C derivative, and is the substance in which glucose is bound to the hydroxyl group at the 2-position of ascorbic acid by α-configuration. AG is a substance which is highly stable and highly safe for the living body. AG is approved as an active ingredient of food additives or quasi drugs, and used, for example, as a main ingredient of cosmetics for whitening or an enrichment of food. VC is a substance which is also known as vitamin C and widely found in nature, and has an antioxidant action. VC is used for food, drugs, quasi drugs, cosmetics, and the like as an antioxidant, an enrichment, or the like. Therefore, the culture medium, the culture medium additive, the kit, the pharmaceutical composition, and the food and drink of the present invention containing AG and/or VC; and the method for promoting the muscle differentiation of cells of the present invention using AG and/or VC are highly safe for cells or the living body. VC used for the present invention may be in a free form, or may be in the form of a salt. Although examples of the salt of VC include a sodium salt, a potassium salt, and a calcium salt, and the like, the salt is not limited to these.

Further, as described above, the present inventors first found that even AG alone promotes muscle differentiation, even VC alone promotes muscle differentiation, and muscle differentiation is promoted even when AG and VC are used in combination. Accordingly, the present invention provides the following.

(a) A culture medium for promoting muscle differentiation, comprising AG and/or VC.

(b) A culture medium additive for promoting muscle differentiation, comprising AG and/or VC.

(c) A kit for promoting muscle differentiation, comprising AG and/or VC.

(d) A method for promoting muscle differentiation of cells, comprising culturing cells in a culture medium comprising AG and/or VC.

(e) A pharmaceutical composition for promoting muscle differentiation, comprising AG and/or VC.

(f) The pharmaceutical composition according to (e) for promoting muscle regeneration.

(g) Food and drink for promoting muscle differentiation, comprising AG and/or VC.

(h) The Food and drink according to (g) for promoting muscle regeneration.

Those skilled in the art can suitably determine the amount of AG added to the culture medium of the present invention depending on the type of stem cells or muscle precursor cells (for example, satellite cells or myoblasts) to be cultured; culture conditions such as cultivation temperature and culture time; the culture medium composition; and the like. For example, around 0.05 mM to around 5 mM, preferably around 0.2 mM to around 2 mM, of AG may be added to a known low serum culture medium for muscle differentiation. The amount of VC added to the culture medium of the present invention is similar to the amount of AG added.

Although the dose of AG by the pharmaceutical composition of the present invention varies depending on the desired degree of muscle regeneration, the administration site, the administration route, and the like, for example, in the case of the oral administration to an adult, the dose may be usually around 10 mg to around 10000 mg, preferably around 100 mg to around 1000 mg per day. A doctor can determine the dose of AG suitably, for example, while seeing the size and the amount of muscle. The dose of VC by the pharmaceutical composition of the present invention is similar to the dose of AG.

Although the intake of AG by the food and drink of the present invention varies depending on the desired degree of muscle regeneration, the muscle regeneration site, and the like, for example, when an adult takes in AG, the intake may be usually around 1 mg to around 10000 mg, preferably around 10 mg to around 1000 mg per day. The intake of VC by the food and drink of the present invention is similar to the intake of AG.

Additionally, the present invention provides the following.

(i) A method for producing a culture medium for promoting muscle differentiation, comprising adding EGT.

(j) A method for producing a culture medium additive for promoting muscle differentiation, comprising adding EGT.

(k) A method for producing a kit for promoting muscle differentiation, comprising adding EGT.

(l) A method for promoting muscle differentiation of cells, comprising culturing cells in a culture medium comprising EGT.

(m) A method for promoting muscle differentiation in a subject in need of promotion of muscle differentiation, comprising administering a pharmaceutical composition comprising EGT to the subject.

(n) The method according to (n) for regenerating muscle.

(o) A method for promoting muscle differentiation, comprising taking in food and drink comprising EGT.

(p) The method according to (o) for regenerating muscle.

In the above-mentioned methods, EGT may be used in combination with AG and/or VC.

Additionally, the present invention provides the following.

(q) Use of EGT for producing a culture medium for promoting muscle differentiation.

(r) Use of EGT for producing a culture medium additive for promoting muscle differentiation.

(s) Use of EGT for producing a kit for promoting muscle differentiation.

(t) Use of EGT for promoting muscle differentiation of cells in a culture medium.

(u) Use of EGT for producing a medicament for promoting muscle differentiation in a subject.

(v) The above-mentioned use, wherein the medicament is for regenerating muscle in the subject.

(w) Use of ergothioneine for producing food and drink for promoting muscle differentiation in a subject.

(x) The use according to (w), wherein the food and drink is for regenerating muscle in the subject.

(y) Use of EGT for promoting muscle differentiation in a subject.

(z) The Use according to (y) for regenerating muscle in the subject.

In the above-mentioned uses, EGT may be used in combination with AG and/or VC.

Additionally, the present invention provides the following.

(aa) A method for producing a culture medium for promoting muscle differentiation, comprising adding AG and/or VC.

(bb) A method for producing a culture medium additive for promoting muscle differentiation, comprising adding AG and/or VC.

(cc) A method for producing a kit for promoting muscle differentiation, comprising adding AG and/or VC.

(dd) A method for promoting muscle differentiation of cells, comprising culturing cells in a culture medium comprising AG and/or VC.

(ee) A method for promoting muscle differentiation in a subject in need of promotion of muscle differentiation, comprising administering a pharmaceutical composition comprising AG and/or VC to the subject.

(ff) The method according to (ee) for regenerating muscle.

(gg) A method for promoting muscle differentiation, comprising taking in food and drink comprising AG and/or VC.

(hh) The method according to (gg) for regenerating muscle.

Additionally, the present invention provides the following.

(ii) Use of AG and/or VC for producing a culture medium for promoting muscle differentiation.

(jj) Use of AG and/or VC for producing a culture medium additive for promoting muscle differentiation.

(kk) Use of AG and/or VC for producing a kit for promoting muscle differentiation.

(ll) Use of AG and/or VC for promoting muscle differentiation of cells in a culture medium.

(mm) Use of AG and/or VC for producing a medicament for promoting muscle differentiation in a subject.

(nn) The above-mentioned use, wherein the medicament is for regenerating muscle in the subject.

(oo) Use of AG and/or VC for producing food and drink for promoting muscle differentiation in a subject.

(pp) The use according to (oo), wherein the food and drink are for regenerating muscle in the subject.

(qq) Use of AG and/or VC for promoting muscle differentiation in a subject.

(rr) The use according to (qq) for regenerating muscle in the subject.

The present invention will be described in further detail and specifically by illustrating Examples hereinafter. Examples are for description, and do not limit the scope of the present invention.

Example 1

C2C12 cells were suspended in a 10% fetal calf serum-containing Dulbecco's modified Eagle's medium (hereinafter, called a growth medium) to adjust the cell density to $65\times10^4$ cells/ml. Then, 1.5 ml of the cell suspension was added to each well of a 6-well plate, and the cells were cultured in a 5% $CO_2$ incubator for 24 hours. The growth medium was removed, and 2 ml of 2% horse serum-containing Dulbecco's modified Eagle's medium containing 0.5 mM EGT (hereinafter, called a differentiation medium) was then added to each well. The differentiation medium was exchanged for a new culture medium every other day, and the culture was continued. A control group was subjected to the exactly same operation except that EGT was not contained. The forms of the cells were observed and photographed through a microscope (NIKON CORPORATION: Eclipse Ts2) on the sixth day after exchange for the differentiation medium. FIG. 1 shows the results. Adding EGT promoted the differentiation from C2C12 cells to muscle cells, and more myotube cells were formed.

Example 2

Figure 2:
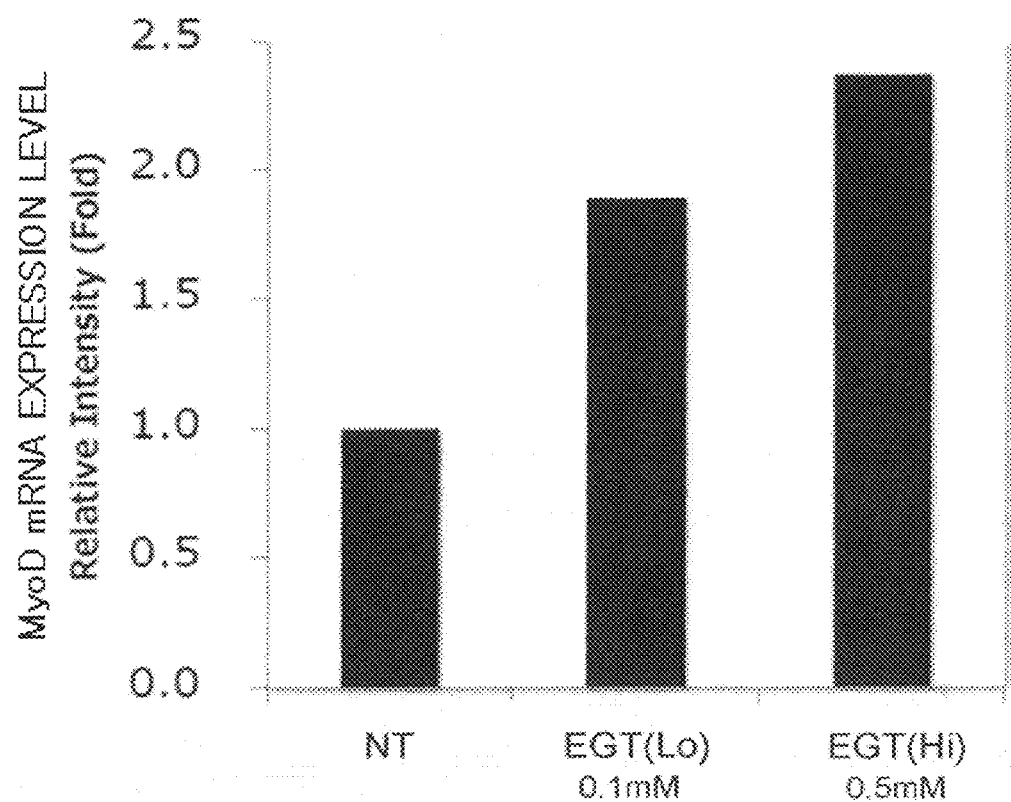
FIG. 2 shows a graph showing an influence of ergothioneine on the MyoD mRNA expression level of C2C12 cells.

C2C12 cells were suspended in a growth medium to adjust the cell density to $65\times10^4$ cells/ml. Then, 1.5 ml of the cell suspension was added to each well of a 6-well plate, and the cells were cultured in a 5% $CO_2$ incubator for 24 hours. The growth medium was removed, and 2 ml of a differentiation medium containing 0.1 mM or 0.5 mM EGT was then added to each well. A control group (hereinafter abbreviated to NT) was subjected to the exactly same operation except that EGT was not contained. The culture medium was removed after 2 days, 1 ml of TRIzol (Invitrogen Corporation) was added to each well, and the cells were dissolved. The cell solution was collected in an Eppendorf tube, and RNA was collected according to the protocol of TRIzol. The complementary strand DNA of the mRNA was obtained by treating the collected RNA with a reverse transcription kit (Takara Bio Inc.). The following primer DNAs (MyoD [NM_010866]: forward 5'TAGTGAATGAGGCCTTCGAGA3' (SEQ ID NO: 1), reverse 5'GCATCTGAGTCGCCACTGTA3' (SEQ ID NO: 2), PPIA [NM_008907]: forward 5'GTCTCCTTCGAGCTGTTTGC3' (SEQ ID NO: 3), and reverse 5'GATGCCAGGACCTGTATGCT3' (SEQ ID NO: 4)) were added to the obtained complementary strand DNA, and the gene expression levels of MyoD and PPIA were measured by subjecting the mixture to a CFX96 Touch™ real time PCR analysis system (Bio-Rad Laboratories, Inc.) using TB Green™ Premix Ex Taq™ II (Takara Bio Inc.) according to the protocol thereof. MyoD is known as a master regulator, which induces muscle differentiation. PPIA is known as a housekeeping gene, and the PPIA gene expression level was used as an internal standard. Correction was performed by dividing the amount of expressed MyoD mRNA by the amount of expressed PPIA mRNA to calculate the MyoD mRNA expression level. FIG. 2 shows the gene expression levels when EGT was added (relative values) with the MyoD mRNA expression level of NT defined as 1. The MyoD mRNA expression level increased depending on the concentration of EGT.

Example 3

Figure 3:
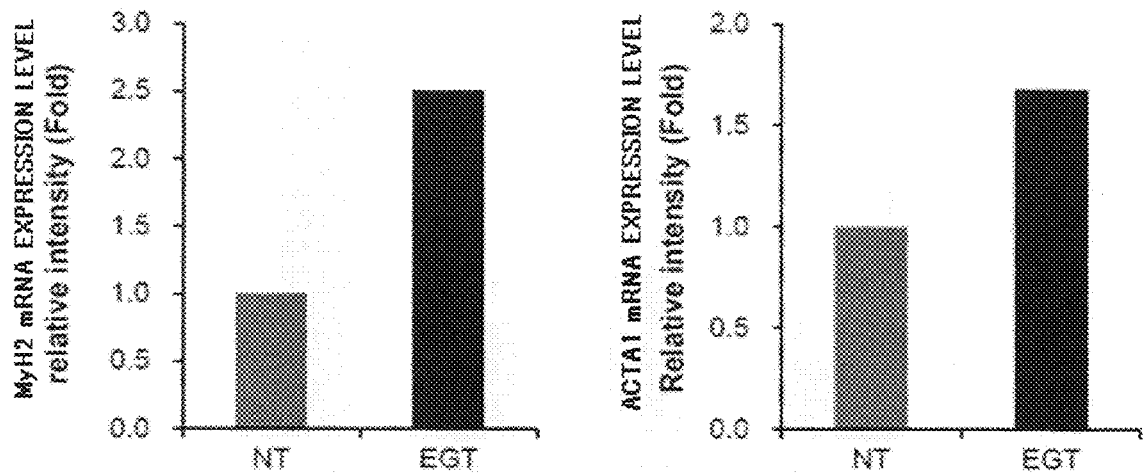
FIG. 3 shows graphs showing influences of ergothioneine on the MyH2 mRNA and ACTA1 mRNA expression levels of C2C12 cells.

C2C12 cells were suspended in a growth medium to adjust the cell density to $65 \times 10^4$ cells/ml. Then, 1.5 ml of the cell suspension was added to each well of a 6-well plate, and the cells were cultured in a 5% $CO_2$ incubator for 24 hours. The growth medium was removed, and 2 ml of a differentiation medium containing 0.5 mM EGT was added. A control group (NT) was subjected to the exactly same operation except that EGT was not contained. The culture medium was removed after 2 days, 1 ml of TRIzol (Invitrogen Corporation) was added to each well, and RNA was collected according to the protocol of TRIzol. The collected RNA was converted into complementary strand DNA with a reverse transcription kit (Takara Bio Inc.). The following primer DNAs (MyH2 [NM_001039545]: forward 5'GAGCAAAGATGCAGGGAAAG3' (SEQ ID NO: 5), reverse 5'TAAGGGTTGACGGTGACACA3' (SEQ ID NO: 6), ACTA1 [NM_001272041]: forward 5'CGACATCAG-GAAGGACCTGT3' (SEQ ID NO: 7), PPIA [NM_008907]: forward 5'GTCTCCTTCGAGCTGTTTGC3' (SEQ ID NO: 3), and reverse 5'GATGCCAGGACCTGTATGCT3' (SEQ ID NO: 4)) were added to the obtained complementary strand DNA, and the gene expression levels of MyH2, ACTA1, and PPIA were measured by subjecting the mixture to a CFX96 Touch™ real time PCR analysis system (Bio-Rad Laboratories, Inc.) using TB Green™ Premix Ex Taq™ II (Takara Bio Inc.) according to the protocol thereof. Correction was performed by dividing the amounts of expressed MyH2 and ACTA1 mRNA by the amount of expressed PPIA mRNA to calculate the myosin heavy chain 2 (MyH2) and a actin (ACTA1) mRNA expression levels. FIG. 3 shows the gene expression levels when EGT was added (relative values) with the mRNA expression levels of NT defined as 1. The MyH2 mRNA and ACTA1 mRNA expression levels increased by adding EGT.

Comparative Example

Figure 4:
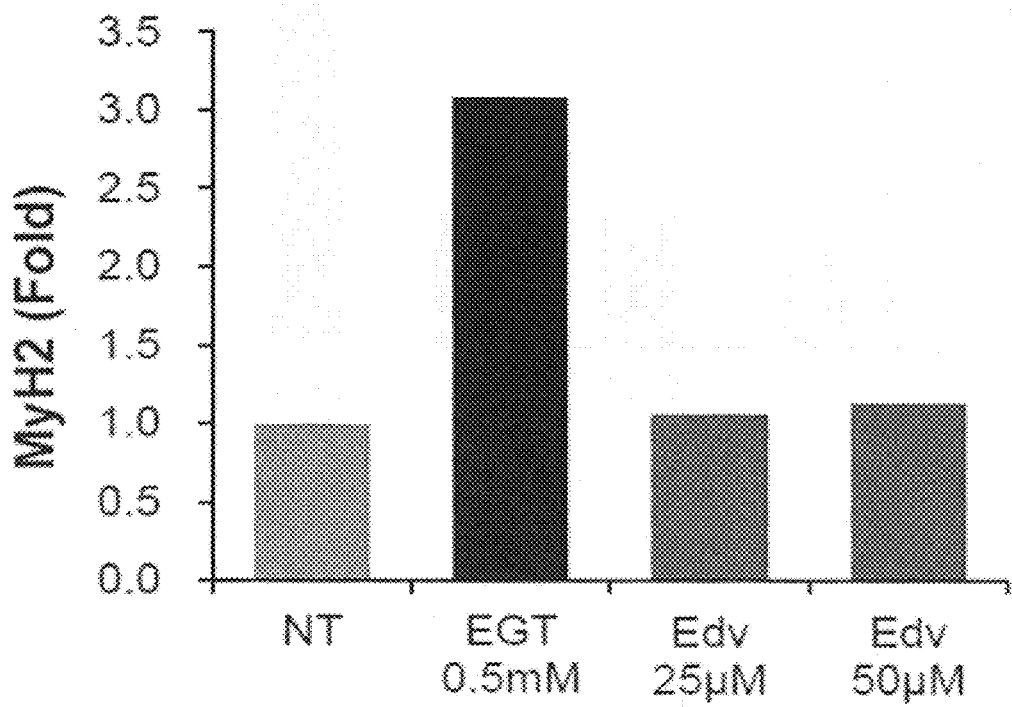
FIG. 4 is a graph showing that the antioxidant edaravone does not influence the MyH2 mRNA expression level of C2C12 cells.

C2C12 cells were suspended in a growth medium to adjust the cell density to $65 \times 10^4$ cells/ml. Then, 1.5 ml of the cell suspension was added to each well of a 6-well plate, and the cells were cultured in a 5% $CO_2$ incubator for 24 hours. The growth medium was removed, and 2 ml of a differentiation medium containing 0.5 mM EGT, 25 µM edaravone (hereinafter, abbreviated to Edv), or 50 µM Edv was added to each well. Edv is a powerful synthetic antioxidant. The culture medium was exchanged for a new culture medium every other day, and the culture was continued. A control group (NT) was subjected to the exactly same operation except that EGT was not contained. The culture medium was removed after 4 days, 1 ml of TRIzol (Invitrogen Corporation) was added to each well, and RNA was collected according to the protocol of TRIzol. The complementary strand DNA of the mRNA was obtained by treating the collected RNA with a reverse transcription kit (Takara Bio Inc.). The following primer DNAs (MyH2 [NM_001039545]: forward 5'GAGCAAAGATGCAGG-GAAAG3' (SEQ ID NO: 5), reverse 5'TAAGGGTTGACGGTGACACA3' (SEQ ID NO: 6), PPIA [NM_008907]: forward 5'GTCTCCTTCGAGCTGTTTGC3' (SEQ ID NO: 3), and reverse 5'GATGCCAGGACCTGTATGCT3' (SEQ ID NO: 4)) were added to the obtained complementary strand DNA, and the gene expression levels of MyH2 and PPIA were measured by subjecting the mixture to a CFX96 Touch™ real time PCR analysis system (Bio-Rad Laboratories, Inc.) using TB Green™ Premix Ex Taq™ II Kit (Takara Bio Inc.) according to the protocol thereof. Correction was performed by dividing the amount of expressed MyH2 mRNA by the amount of expressed PPIA mRNA to calculate the MyH2 mRNA expression level. FIG. 4 shows the gene expression level when EGT or Edv was added (relative values) with the MyH2 mRNA expression level of NT defined as 1.

The antioxidant Edv did not affect the MyH2 expression level of C2C12. This result revealed that the MyH2 expression level did not increase by a mere antioxidant effect.

Example 4

Figure 5:
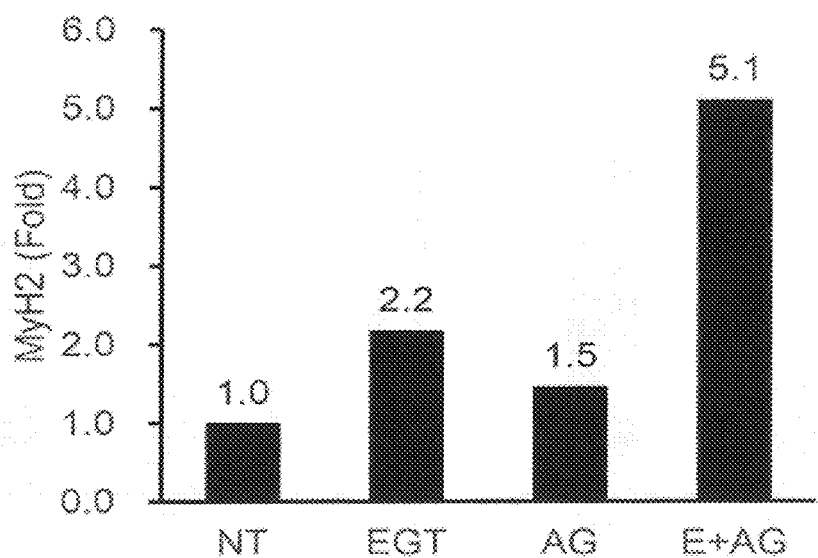
FIG. 5 is a graph showing influences of the combined use of ergothioneine and ascorbic acid 2-glucoside, and the single use of ascorbic acid 2-glucoside, on the MyH2 mRNA expression levels of C2C12 cells (top panel); and on the ACTA' mRNA expression levels of C2C12 cells (bottom panel). In the figure, EGT indicates that a culture medium containing ergothioneine was used, AG indicates that a culture medium containing ascorbic acid 2-glucoside was used, and E+AG indicates that a culture medium containing ergothioneine and ascorbic acid 2-glucoside was used. NT indicates that a culture medium without ergothioneine or ascorbic acid 2-glucoside was used.
Figure 5:
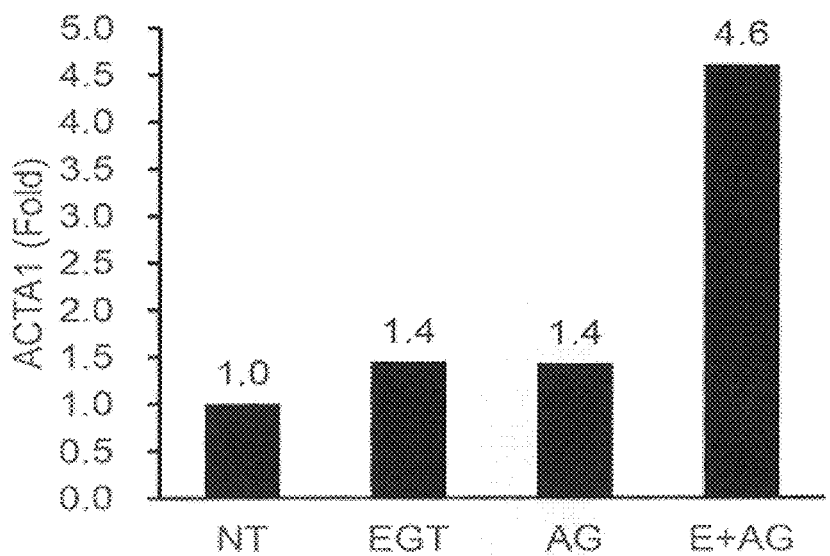

The amounts of MyH2 and ACTA1 mRNA expression of C2C12 cells when the differentiation medium containing only EGT was used, when the differentiation medium containing EGT and AG was used, and when the differentiation medium containing only AG was used were investigated. AA2G(R) produced by Hayashibara Co., Ltd. was used as AG. The concentration of EGT in the differentiation medium was 0.5 mM, and the concentration of AG was 1.0 mM. The experiment procedure was the same as that of Example 3. A control group (NT) was subjected to the exactly same operation except that EGT or AG was not contained. FIG. 5 shows the results. It was confirmed that the MyH2 mRNA and ACTA1 mRNA expression greatly increased by adding EGT and AG to the culture medium. These results show that muscle differentiation is greatly promoted using EGT and AG in combination. It was confirmed that also when only AG was added to the culture medium, the MyH2 mRNA and ACTA1 mRNA expression increased. This result shows that even though AG was used alone, muscle differentiation is promoted.

Example 5

Figure 6:
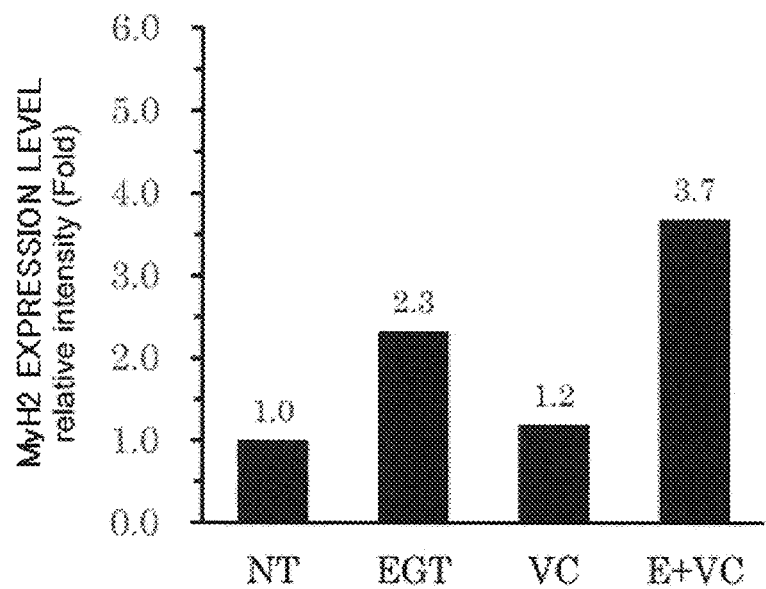
FIG. 6 is a graph showing influences of the combined use of ergothioneine and ascorbic acid, and the single use of ascorbic acid, on the MyH2 mRNA expression levels of C2C12 cells (top panel); and on the ACTA1 mRNA expression levels of C2C12 cells (bottom panel). In the figure, EGT indicates that a culture medium containing ergothioneine was used, VC indicates that a culture medium containing ascorbic acid was used, and E+VC indicates that a culture medium containing ergothioneine and ascorbic acid was used. NT indicates that a culture medium without ergothioneine or ascorbic acid was used.
Figure 6:
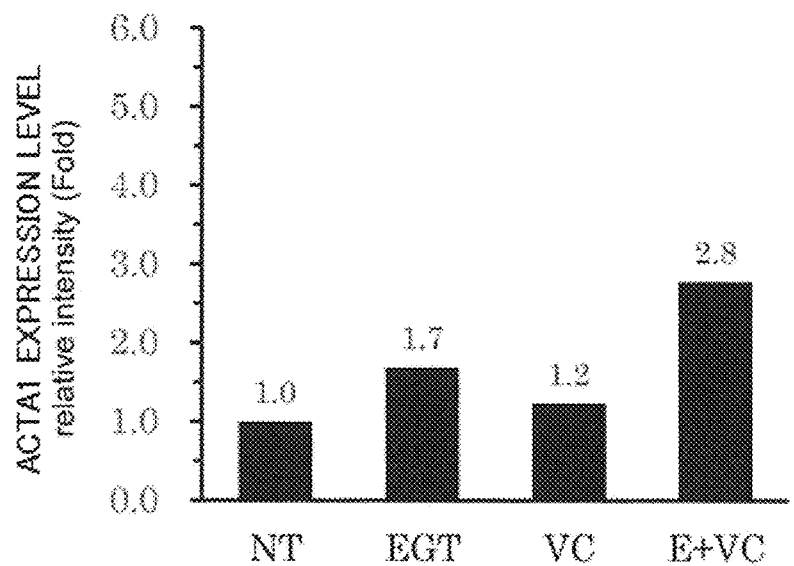

The amounts of MyH2 and ACTA1 mRNA expression of C2C12 cells when the differentiation medium containing only EGT was used, when the differentiation medium containing EGT and VC was used, and when the differentiation medium containing only VC was used were investigated. The concentration of EGT in the differentiation medium was 0.5 mM, and the concentration of VC was 0.5 mM. The experiment procedure was the same as that of Example 3. A control group (NT) was subjected to the exactly same operation except that EGT or VC was not contained. FIG. 6 shows the results. It was confirmed that the MyH2 mRNA and ACTA1 mRNA expression greatly increased by adding EGT and VC to the culture medium. These results show that muscle differentiation is greatly promoted using EGT and VC in combination. Further, it was confirmed that also when only VC was added to the culture medium, the MyH2 mRNA and ACTA1 mRNA expression increased. This result shows that even though VC was used alone, muscle differentiation is promoted.

INDUSTRIAL APPLICABILITY

The present invention can be used in fields such as drugs and food, and the like, and fields such as research reagents.

Sequence Listing Free Text

SEQ ID NO: 1 represents the nucleotide sequence of the forward primer for amplifying the MyoD gene.

SEQ ID NO: 2 represents the nucleotide sequence of the reverse primer for amplifying the MyoD gene.

SEQ ID NO: 3 represents the nucleotide sequence of the forward primer for amplifying the PPIA gene.

SEQ ID NO: 4 represents the nucleotide sequence of the reverse primer for amplifying the PPIA gene.

SEQ ID NO: 5 represents the nucleotide sequence of the forward primer for amplifying the MyH2 gene.

SEQ ID NO: 6 represents the nucleotide sequence of the reverse primer for amplifying the MyH2 gene.

SEQ ID NO: 7 represents the nucleotide sequence of the forward primer for amplifying the ACTA1 gene.

The invention claimed is:

1. A method for promoting muscle differentiation of cells, the method comprising:
    culturing cells in a low serum culture medium for muscle differentiation comprising ergothioneine.

2. The method of claim 1, wherein the culture medium further comprises ascorbic acid 2-glucoside and/or ascorbic acid.

3. A method for promoting muscle differentiation, the method comprising:
    administering to a subject in need thereof a pharmaceutical composition comprising ergothioneine.

4. The method of claim 3, wherein the pharmaceutical composition further comprises ascorbic acid 2-glucoside and/or ascorbic acid.

5. The method of claim 3, which is suitable for promoting muscle regeneration.

6. A method for promoting muscle differentiation, the method comprising:
    taking in a food or drink, comprising ergothioneine.

7. The method of claim 6, wherein the food or drink further comprises ascorbic acid 2-glucoside and/or ascorbic acid.

8. The method of claim 1, wherein the culture medium further comprises ascorbic acid.

9. The method of claim 1, wherein the culture medium further comprises ascorbic acid 2-glucoside.

10. The method of claim 8, wherein the culture medium further comprises ascorbic acid 2-glucoside.

11. The method of claim 3, wherein the pharmaceutical composition further comprises ascorbic acid.

12. The method of claim 3, wherein the pharmaceutical composition further comprises ascorbic acid 2-glucoside.

13. The method of claim 11, wherein the pharmaceutical composition further comprises ascorbic acid 2-glucoside.

14. The method of claim 6, wherein the food or drink further comprises ascorbic acid.

15. The method of claim 14, wherein the food or drink further comprises ascorbic acid 2-glucoside.

* * * * *